3,198,785
SULFAMOYL AZABICYCLONONANES AND
DERIVATIVES THEREOF
William J. Houlihan, Mountain Lakes, N.J., assignor to
Sandoz Inc., Hanover, N.J.
No Drawing. Filed Apr. 17, 1964, Ser. No. 360,742
6 Claims. (Cl. 260—239)

This invention is directed to 3-sulfamoyl-3-azabicyclo-[3,2,2]nonanes and an intermediate in the preparation thereof. The subject compounds have the structure

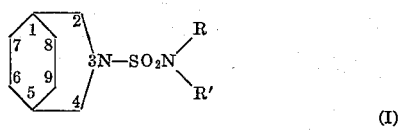

wherein each of R and R' is, independently, either a hydrogen atom or loyer alkyl, preferably having from one to four carbon atoms, e.g. methyl, ethyl, propyl, isopropyl and butyl, whereas the intermediate is 3-chlorosulfonyl-3-azabicyclo-[3,2,2]nonane, which has the structure

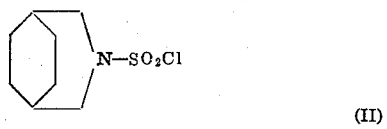

Compound (I) is prepared by reacting 3-azabicyclo-[3,2,2]nonane with sulfamide, when both R and R' are hydrogen atoms. An inert (one which reacts neither with the reactants nor the subject compound under the reaction conditions) solvent medium may be used, but is not required. The reaction takes place by simple admixture of the stated reactants at a temperature within the range of from 50° to 200° C. When a solvent medium is employed, the solvent is preferably a tertiary amine, such as a tri(lower)alkylamine, e.g. triethylamine; an aryldi(lower)alkylamine, e.g. phenyldimethylamine; a diaryl (lower)alkylamine, e.g. diphenylethylamine; and a triarylamine, e.g. triphenylamine; but other solvents may also be employed. Examples of other suitable solvents are: pyrrole, lower alkyl pyrrole, lower alkoxy pyrrole, pyridine, lower alkyl pyridine, lower alkoxy pyridine, quinoline, lower alkyl quinoline, lower alkoxy quinoline, N-(lower)alkyl morpholine, N-aryl morpholine, N,N'-di(lower)alkyl piperazine, N,N'-ar(lower)alkyl piperazine and N,N'-diaryl piperazine. (In the enumeration of solvents, each lower alkyl and the alkyl of each lower alkoxy are, e.g. methyl, ethyl, propyl, isopropyl and butyl; and each aryl (or ar-) is preferably phenyl.

Although stirring is preferred, it is not necessary. The reaction proceeds to completion in from one to five hours.

An alternative method of preparing compound (I) is a two-step process involving, as the first step, reacting 3-azabicyclo[3,2,2]nonane with sulfonyl chloride at a low temperature, i.e. one within the range of from −50° to 0° C., in a solvent medium and, as the second step, aminating the intermediate (II) either by contacting same with liquid ammonia or by admixing same with a saturated diethylether solution of ammonia at a temperature of less than 20° C.

The reaction with sulfonyl chloride is effected by simple admixture with continuous stirring and takes from one to five hours. The solvent medium is an inert solvent, i.e. the solvent retcts under the contemplated conditions with neither the reactants nor the intermediate (II), which the reaction produces. Any inert solvent can be used, e.g. di(lower)alkylethers, such as diethylether; hydrocarbons, such as benzene and toluene; lower mono-, di-, tri- and poly-chloroalkanes, such as 1-propyl chloride, 1,1-dichloroethane and 1,1,3-trichloropropane; cyclic monoethers, such as tetrahydrofuran; and cyclic diethers, such as dioxane. In addition to the inert solvent, as exemplified, one or more tertiary amines, such as enumerated for the reaction with sulfamide, may also be present as part of the reaction medium.

When only one of R and R' is a hydrogen atom, compounds (I) are prepared by aminating compound (II) with

wherein
R is a hydrogen atom, and
R' has its above-ascribed meaning.

The reaction between compound (II) and compound (III) is actually a general reaction when both R and R' have any of their above-ascribed meanings. Thus, compound (III) is either ammonia, a primary (lower)alkylamine, e.g. isopropylamine, or a secondary di(lower)alkylamine, e.g. N-methyl-N-ethylamine.

When both R and R' are lower alkyl, a further method of preparing compounds (I) may be employed. According to this method 3-azabicyclo[3,2,2]nonane is reacted (admixed) with

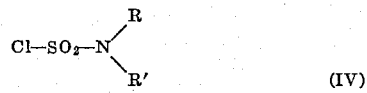

wherein each of R and R' is, independently, a lower alkyl, e.g. methyl, ethyl, propyl, isopropyl and butyl.

Stirring is not required for this method, and the temperature may be anywhere within the range of from −10° to 50° C. A solvent reaction system is advantageously employed. Any inert solvent can be used for this purpose, e.g. di(lower)alkylethers, such as diethylether; hydrocarbons, such as benzene and toluene; lower mono-, di-, tri- and poly-chloroalkanes, such as 1-propyl chloride, 1,1 - dichloroethane and 1,1,3 - trichloropropane; cyclic monoethers, such as tetrahydrofuran; and cyclic diethers, such as dioxane.

The subject compounds (I) are potent CNS (central nervous system) stimulants useful as analeptics and mood elevators. They may be administered either orally or parenterally in daily doses of from 10 milligrams to 15 milligrams.

The following examples illustrate the preparation of the subject compounds. The parts and percentages are by weight, the relationship between parts by weight and parts by volume is the same as that of the kilogram to the liter, and the temperatures are in degrees centigrade.

EXAMPLE 1

3-sulfamoyl-3-azabicyclo[3,2,2]nonane

In a flask equipped with a stirrer and a condenser attached to a bubbler admix 8.8 parts (0.07 mole) of 3-azabicyclo[3,2,2]nonane, 9.6 parts (0.10) sulfamide and 100 parts by volume of pyridine. Stir and reflux the resulting solution until gassing is no longer detected in the bubble detector. Remove the solvent (pyridine) on a rotary evaporator. Dissolve the resulant solid in 80 parts by volume of methanol, reflux the obtained solution with charcoal and then filter the resultant through a Celite filter bed. Admix 10 parts by volume of water with the warm filtrate, and place the product in a refrigerator (8°). There are thus obtained as precipitate 6.5 parts of 3-sulfamoyl-3-azabicyclo[3,2,2]nonane, melting point (M.P.) 161° to 162.5°.

EXAMPLE 2

*3-(N,N-dimethylsulfamoyl)-3-azabicyclo[3,2,2]nonane*

In a flask equipped with a stirrer and a dropping funnel admix 12.5 parts (0.10 mole) of 3-azabicyclo[3,2,2]nonane and 75 parts by volume of absolute toluene. Cool the resulting solution to 15°. Thereafter add dropwise thereto 7.2 parts (0.05 mole) of N,N-dimethylsulfamoyl chloride (at a low enough rate to maintain the temperature at 20°±5°.) Stir the obtained reaction mixture for 8 hours at room temperature (20°) before removing the solvent in vacuo on a rotary evaporator.

Crystallize the solid residue from methanol/water. There are thus obtained 11.5 parts of title compound, M.P. 90° to 91°.

What is claimed is:
1. A compound of the formula

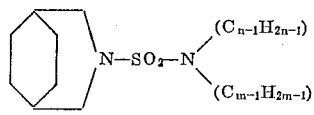

wherein each of $m$ and $n$ is a positive whole number of at most 5.

2. 3-(N,N-diloweralkylsulfamoyl)-3-azabicyclo[3,2,2]nonane.
3. 3-(N-monoloweralkylsulfamoyl)-3-azabicyclo[3,2,2]nonane.
4. 3-sulfamoyl-3-azabicyclo[3,2,2]nonane.
5. 3-(N,N-dimethylsulfamoyl)-3-azabicyclo[3,2,2]nonane.
6. 3-chlorosulfonyl-3-azabicyclo[3,2,2]nonane.

No references cited.

NICHOLAS S. RIZZO, *Primary Examiner.*